United States Patent [19]

Zwirner

[11] 4,017,062
[45] Apr. 12, 1977

[54] PRESSURE SPRING

[75] Inventor: Eckhard Zwirner, Nufringen, Germany

[73] Assignee: Stumpp & Schule KG, Beuren, Germany

[22] Filed: Sept. 18, 1975

[21] Appl. No.: 614,665

[30] Foreign Application Priority Data

Sept. 18, 1974 Germany ............... 314151[U]
May 15, 1975 Germany ................... 2521646

[52] U.S. Cl. .................................... 267/166
[51] Int. Cl.² ............................... F16F 1/04
[58] Field of Search .......... 267/60, 61 R, 166, 167, 267/170, 174–176, 179, 180; 123/90.65, 90.66, 90.67, 90.29, 188 SA, 188 SB, 188 SC; 137/535, 538; 251/337

[56] References Cited

UNITED STATES PATENTS 1,878,128  9/1932  Griswold ................. 267/174 X
3,110,298  11/1963 Giles ..................... 123/90.67 X
3,336,842  8/1967  Adelt ..................... 267/180 X

FOREIGN PATENTS OR APPLICATIONS 2,258,572  6/1974  Germany
2,000,472  7/1971  Germany ................ 267/166
22,363    4/1966  Japan ................... 267/166
864,441   4/1961  United Kingdom ......... 123/188 SA Primary Examiner—Johnny D. Cherry
Attorney, Agent, or Firm—Edwin E. Greigg

[57] ABSTRACT

A helical valve spring has terminal coils whose diameter and pitch are different from those of adjacent coils in the main body of the spring. The part of the spring lying between the terminal coil and the adjacent coil in the main body of the spring constitutes a transition zone. When the associated valve is opened, i.e., when the spring is in its maximum state of compression, a portion of the transition zone is in contact with a portion of the adjacent coil in the main body of the spring. This contact damps the natural vibration of the spring.

9 Claims, 9 Drawing Figures n= 4000 U/min n= 6000 U/min n= 4000 U/min n= 6000 U/min n= 7200 U/min

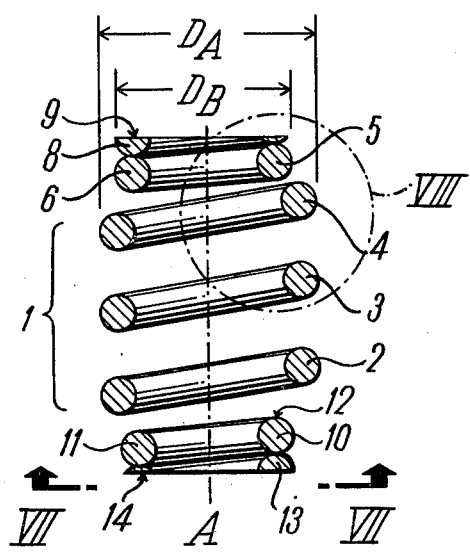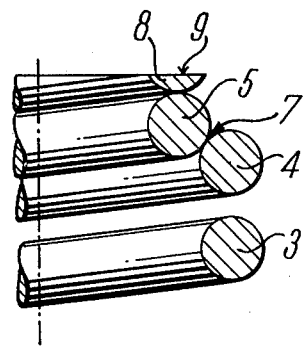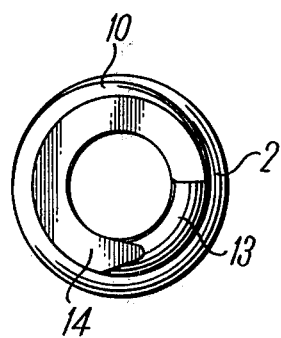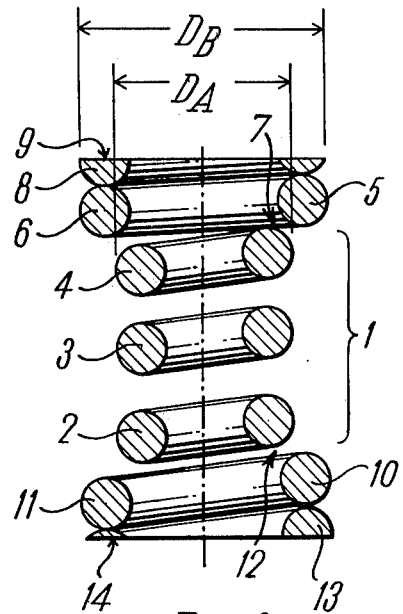
Fig. 6
Fig. 8
Fig. 7
Fig. 9

PRESSURE SPRING

BACKGROUND OF THE INVENTION

The present invention relates to a pressure spring, preferably a helical valve spring, for assembly in engines, pumps or the like, in which it is compressed to a first extent in a first operating state, e.g., when the valve is closed and to a second extent which exceeds the first in a second operating state, i.e., when the valve is open.

If, for example, this type of valve spring is installed in an internal combustion engine of the type used in automobiles, the value will be closed in the first operating state during which a certain amount of compression takes place and it will be open in the second operating state in which the valve spring is compressed to a still greater extend. In the course thereof the following problem arises: after completion of a first stroke between the first and the second operating state or condition, which the valve spring carries out under the force of the sinusoidal motion of the camshaft, i.e., after closing of the valve, the spring exhibits in its first operating condition oscillations of the inner tangential stress $\tau_k$, which occur with the inherent natural frequency of the spring. These oscillations only die out after some time has lapsed (fade-out). This fade-out should have been ended before the next stroke begins, since only then no increase of the inner tangential stress can be caused at this time by the oscillation and only then a satisfactory operation of the valve springs can be ensured. However, with known valve springs this has not been possible in case of high rotational speeds of the engines. At high rotational speeds, the amplitude of these oscillations at the fade-out will become rather high; this results in the fact that the fade-out has not yet come to an end, when the next stroke begins. This again results in an increase in the upper tangential stress $\tau_{ko}$ by the amount of the amplitude of the oscillation at the beginning of the subsequent stroke. This corresponds to the residual energy which still remains in the spring at the beginning of the next stroke.

This increase in the inner tangential shearing stress is essentially undesirable as it represents increased loading of the spring and thus should be avoided. The vibrations per se are also generally undesirable as they can cause incorrect closing of the valve.

The object of the present invention is to design a pressure spring of the type described initially which can be incorporated in automobile engines as a valve spring in such a way that is has improved speed characteristics over the known pressure springs. Characteristic behavior at high rotational speeds is considered to be "improved," if, at the closing of the valve, an increase in the maximum inner tangential stress $\tau_{ko}$, as caused by oscillations of the inner tangential stress, is essentially avoided. This problem is solved by providing the spring with windings, which differ from adjacent windings in terms of diameter and slope in such a manner that a transitional zone or more than just one transitional zone respectively are formed between these windings and the adjacent ones, and that the transitional zones contact or rest against the adjacent windings over a predetermined area. This contact should at least be present in the second condition of operation. Thereby through the frictional contact of the transitional zone and the adjacent winding, a damping of the oscillations of the inner tangential stress occurs, which leads to a considerably quicker fade-out of these oscillations than with known springs, i.e., without damping by frictional contact. As a result, the aforementioned disadvantages of the known springs are avoided.

Helical springs with inwardly-turned end coils are already known (German Pat. No. 1,169,209). However, in the case of the latter, emphasis is placed on ensuring that the end coils of the spring do not contact the adjacent coils during operation. The present invention, on the other hand, is based on the concept that friction is possible without disadvantageous consequences and that it can be used to dampen the vibrations of the inner tangential stress. Insofar as inwardly-wound end coils are otherwise known (German Offenlegungsschrift No. 2,258,572), they are used to allow for reduced height dimensions in a state, in which the spring is blocked, i.e., when all the windings rest against one another. The latter German disclosure makes no reference to avoiding vibrations or oscillations, which occur with the inherent natural frequency.

Among the various advantageous features of the invention are the following:

Friction damping is obtained by the fact that the transition zone or transition zones respectively contact or rest against the adjacent windings. This results in lower oscillation amplitudes of the inner tangential stress and a more rapid decline of the same, i.e., a quicker fade-out. The oscillatory energy, which still is present at the beginning of the next stroke, is correspondingly less and accordingly the increase in the maximum tangential stress $\tau_{ko}$, which occurs at extremely high rotational speeds, is also considerably reduced as compared with known valve springs. As a result, the characteristic behavior at high rotational speeds is substantially improved.

It is one advantageous feature of the invention that the end windings are disposed to lie in a plane, which extends perpendicular to the axis of the spring. Thereby it is possible to avoid to grind a surface at the end of the end windings to obtain an abutting surface, against which any support of the spring may rest.

The aforementioned advantages also make it possible to employ a symmetrical configuration without incurring the disadvantages which might be expected. As a result of the symmetrical configuration it is not necessary to specify a particular assembly direction while an advantageous distribution of tension within the spring is obtained.

The relatively high inherent frequency selected according to an advantageous feature of the invention is higher than the inherent frequency of known valve springs. In combination with the marked damping of the vibration amplitude it is presumably responsible for the fact that the energy released when the valve is closed is reduced more rapidly than in the case of the known valves.

The relatively large looping angle according to an advantageous feature of the invention provides for a good support and good seating of the valve spring in other machine elements, in which the spring is received (rotocap and valve plate).

Other objects, features and advantages of the present invention will be made apparent in the course of the following description thereof which is provided with reference to the accompanying drawings.

BRIEF DESCRIPTION OF THE DRAWINGS

FIG. 6 shows a cross-section through a second embodiment of the invention in the first operating state when the valve is closed;

FIG. 7 shows a view of the embodiment according to FIG. 6 in the direction of the arrows VII—VII.

FIG. 8 is an enlarged view of the zone VIII in FIG. 6 of the second operating state when the valve is open; and FIG. 9 is a cross-section through a third embodiment of the invention.

DESCRIPTION OF THE INVENTION

Figures 1, 2, 3:
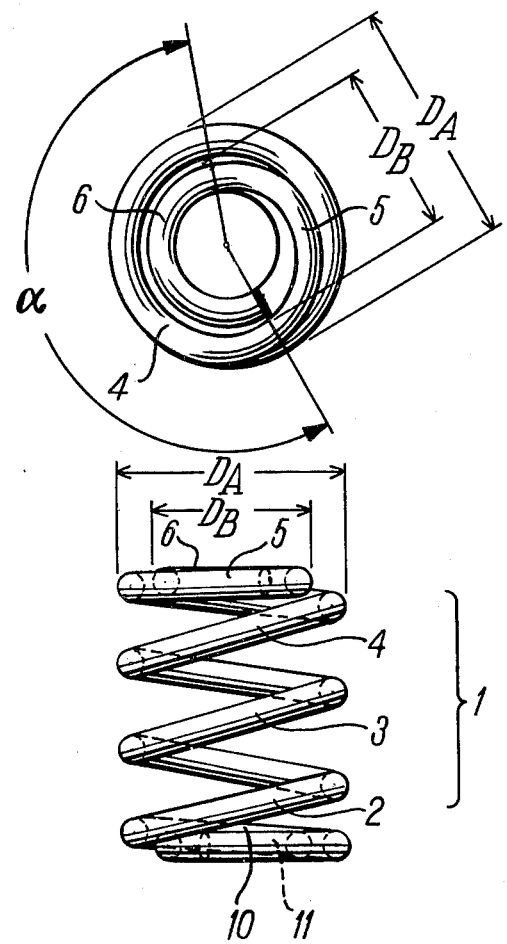
FIG. 1 is a plan view of a first embodiment of the invention.
FIG. 2 is a side view of the valve spring according to FIG. 1 in the relaxed state.
FIG. 3 is a side view of the valve spring in a first operating state when the valve is closed.

Turning now to the drawings, FIGS. 1 and 2 show the helical valve spring depicting the first embodiment of the invention. In FIG. 3 the valve spring is represented in a first operating state, that is when the valve of a combustion engine is closed and the spring is slightly compressed. In a second operating state, e.g., when the valve of the combustion engine is open the spring is compressed by an even greater extent.

The central cylindrical region of the valve spring 1 consists of three coils 2, 3, 4 of constant diameter $D_A$. The inwardly-turned coil 6 having the outer diameter $D_B$ follows the upper coil 4. As will be seen in the plan view of FIG. 1, $D_B$ is smaller than $D_A$ and the coil 6 extends with a constant diameter $D_B$ over a circumferential angle $\alpha$ of 200°. The transition from the coil 4 to the coil 6 is via a transitional zone 5, the diameter of which decreases in the direction of coil 6 from coil 4. As is best shown in FIGS. 2 and 3 the inwardly-wound coil 11 of diameter $D_B$ joins the lower coil 2 after the transitional zone 10.

In addition the outer diameter $D_B$ differs to such an extent from the outer diameter $D_A$ and is coordinated with the slope of the windings in such a way that the transition zones 5 and 10 rest against or contact the adjacent windings 4 and 2 over areas which are indicated at 7 and 12 respectively. In the embodiment of FIG. 3, the transition zones 5, 10 are in contact with the adjacent windings 7, 12 in the first operating condition, in which the valve is closed. As a result, in the second operating condition, this situation is even more marked. In any case, this contact, which provides for the frictional damping, should exist in at least one operating condition.

The friction between the winding 4 and the transition zone 5 along the area 7 and between the winding 2 and the transition zone 10 along the area 12 provides increased damping of the inner tangential stress of the spring as will be made apparent in the following description provided with reference to FIGS. 4a, 4b, 5a, 5b, 5c.

Figure 4A:
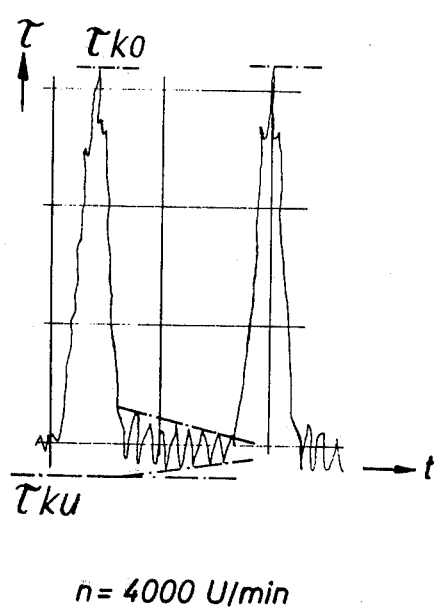
FIGS. 4a and 4b show the course of the inner tangential stress in the case of a known valve spring in operation at speeds of $n = 4,000$ rpm, and $n = 6,000$ rpm.
Figure 4B:
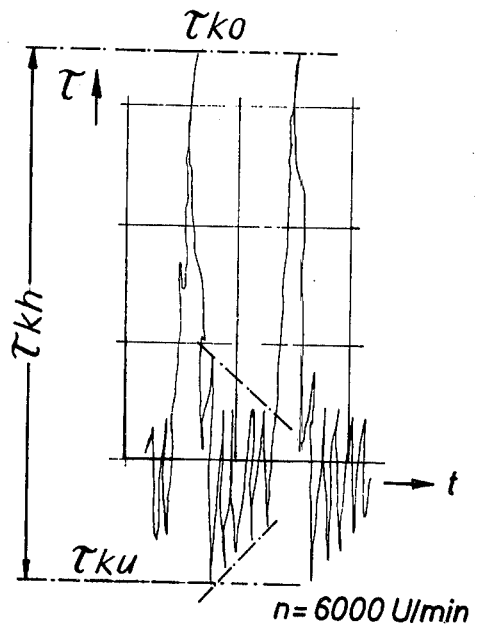

FIGS. 4a and 4b show the course of an inner tangential stress $\tau_k$ in the case of a known valve spring at a speed of $n = 4,000$ rpm (FIG. 4a), or $n = 6,000$ rpm (FIG. 4b), respectively.

At 4,000 rpm, as represented in FIG. 4a, this known spring operates satisfactorily. When the valve is opened, i.e., when the pressure of the valve spring is increased, the inner tangential stress increases to a maximum value, $\tau_{ko}$ and falls again to the minimum value $\tau_{ku}$ when the valve is closed. The following applies $\tau_{ko} - \tau_{ku} = \tau_{kh}$. $\tau_{kh}$ is the stroke of the stress. However, when the valve is closed the minimum value $\tau_{ku}$ is not obtained immediately as the energy absorbed during compression of the spring produces stress peaks in the released spring.

These peaks result in oscillations of the inner tangential stress $\tau_k$, which are carried out with the inherent or natural frequency of the spring. The amount of energy, which still is present in the spring, when the valve is closed, determines the amplitude of these oscillations. The rate, at which these oscillations fade out, depends on the damping of the spring. This fade-out-rate is indicated by the envelope, which is shown in dot-dash-lines in the drawings. At a speed of $n = 4,000$ rpm, the amplitude of these oscillations has already decreased to such an extent at the beginning of the subsequent stroke that it no longer influences the inner tangential stress during this subsequent stroke and, consequently, does no longer cause an increase in the inner tangential stress during that next stroke.

As is apparent from FIG. 4b, this situation changes in the case of the known valve spring at a speed of $n = 6,000$ rpm. The amplitude of the vibrations of the inner tangential stress still possesses a relatively high value when the valve is again opened. Thus, at this point, the valve spring still has a relatively high energy content. As a result, when the valve is reopened, there is an increase in the maximum inner tangential stress $\tau_{ko}$. This is independent of the instantaneous value of the inner tangential stress at the beginning of the next stroke.

This increase in the inner tangential stress is undesirable at $\tau_{ko}$ and $\tau_{kh}$, which serve as the basis of the dimensions of the spring, should remain the same over the entire speed range. This increase in $\tau_k$, which results from the residual energy present in the valve spring upon reopening of the valve, also produces excessive undesirable stressing of the spring. In addition, the durability of the spring is dependent on $\tau_{kh}$ and $\tau_{ko}$. Vibrations of the inner tangential stress at higher amplitudes can also cause rupturing of the spring. Furthermore, the valve may also reopen for a short period of time and it is apparent that this is undesirable and can cause a reduction in the efficiency of the engine.

In the case of the valve spring, according to the invention, the fact that windings are in contact with the transition zones 5 and 10 produces an increased damping of these vibrations, thereby avoiding the aforementioned disadvantages. As a result, the energy of the vibrations is more rapidly depleted and there is also a more rapid reduction of the amplitude of the vibrations as well as a reduced amplitude per se.

This process is assisted by the fact that the inherent frequency of the improved valve spring is constructionally so determined as to be higher than that of the known valve springs. The inherent frequency of the valve spring is calculated in a known manner on the basis of the constructional form of the spring, viz., publication DIN* 2089, page 1. In the case of the vavle according to the invention the inherent frequency is 380–500 Hz, preferably 450 Hz.

* Deutsche Industrie Norm (German Industrial Standard)

This was previously considered unfeasible; however, it is now realistic, since according to the invention an increased damping of the oscillations of inherent frequency is attained at the closing of the valve. By virtue of the fact that the transition zones contact the adjacent windings the inherent frequency is increased while there is also greater damping through friction.

Figure 5A:
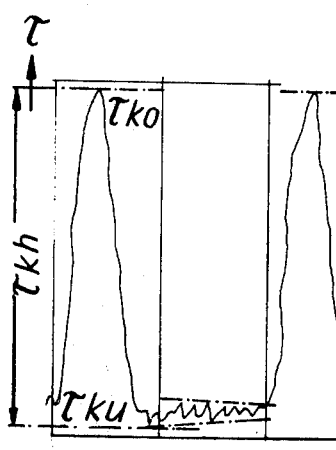
FIGS. 5a, 5b and 5c show the course of the inner tangential stress in the case of the valve spring according to FIG. 1 at speeds of $n = 4,000$, 6,000 and 7,200 rpm.
Figure 5B:
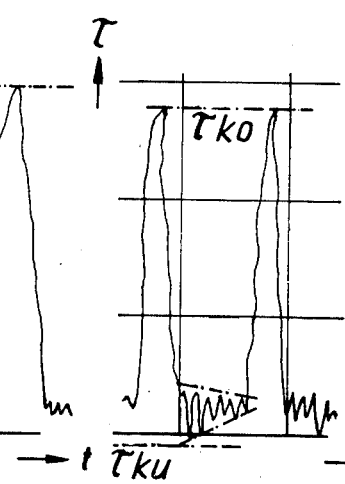
Figure 5C:
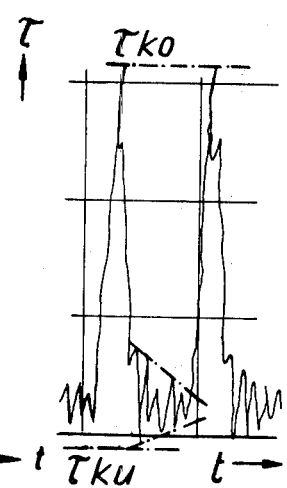

The vibration curve for an embodiment of the invention is represented in FIGS. 5a, 5b and 5c for the speeds $n = 4,000$, 6,000 and 7,000 rpm.

As may be noted from FIG. 5a, the vibrational amplitude is already considerably lower than that of the known valve springs, e.g., compare FIG. 4a at a speed of only $n = 4,000$ rpm with that of FIG. 5a. FIG. 5b shows that, at $n = 6,000$ rpm the vibrational amplitude decreases very rapidly to a low value. Thereby $\tau_{kh}$ remains approximately constant and the maximum value $\tau_{ko}$ even drops slightly. FIG. 5c shows the vibrational conditions at $n = 7,200$ rpm. It can be noted that the vibrational amplitude decreases very rapidly and that by the time the valve reopens the residue of vibrational energy of the valve spring is very low. As a result, there is only a very slight increase in the maximum inner tangential stress $\tau_{ko}$ and of the stroke of the stress $\tau_{kh}$. The increase is substantially lower than in the case of the known valve springs as explained in connection with the prior art shown in FIGS. 4a and 4b.

In the embodiment of the invention according to FIGS. 1–3, the windings 6 and 11, which have the smaller diameter $D_B$, are turned inwardly. They are disposed in a plane at right angles to the axis of the spring. As a result, a more reliable seat of a spring plate or the like is provided. In addition, the end windings extend over a relatively large looping angle of 200°, over which they have constant diameter.

FIGS. 6–8 show a second embodiment of the invention. FIG. 6 shows the valve spring in the first operating state (valve closed). The section designated by VIII is represented in the second operating state in FIG. 8 (valve open). In this state the spring is more compressed. The difference with respect to the embodiment according to FIGS. 1–3 is that the winding 6, having the outer diameter $D_B$, does not extend at right angles to the plane of the spring axis A, but is also inclined and that there is provided another winding 8, which follows winding 6, However, this further winding 8 completely rests on winding 6. Thus, it does not contribute to the behavior of the valve spring as a whole. The winding 8 is ground down along a face 9 extending at right angles to the spring axis A. The lower end of the valve spring has a corresponding form. The winding 11 of outer diameter $D_B$ follows winding 2 after the transitional zone 10. The winding 13 with the ground face 14 follows the coil 11 and rests thereon. It will be noted from FIGS. 6–8, that by providing the "dead" coils 8 and 13, which do not contribute to the spring performance, it is possible to lengthen the height of the overall spring while maintaining a predetermined spring performance.

The embodiment according to FIG. 9 differs from the embodiment according to FIGS. 6–8 in that the coils 6 and 11 which follow the central region 1 at the upper or lower portion have a larger diameter than the coils 2, 3, 4 or the center region. Consequently, $D_A$ is the determining factor for installation.

What is claimed is:

1. A helical valve spring with a plurality of first windings of a first diameter and at least one second winding with a second diameter, which is different from the first diameter, in which each second winding is provided adjacent to one of the first windings and connected to it by a transitional zone of changing diameter, which spring is in a first condition of operation, in which a valve operatively associated with the valve spring is closed, compressed to a first extent and, in a second condition of operation, in which the operatively associated valve is open, still further compressed to a second extent, characterized in that each transitional zone, at least in the second condition of operation, is in frictional contact over a predetermined area with its respective adjacent winding.

2. The valve spring as claimed in claim 1, in which each transitional zone already frictionally contacts its respective adjacent winding in the first condition of operation.

3. The valve spring as claimed in claim 1, in which the inherent natural frequency of the valve spring is between 380 and 500 and preferably 450 Hz.

4. The valve spring as claimed in claim 1, in which the plurality of first windings define end windings disposed to lie in a plane, which extends perpendicular to the longitudinal axis of the spring.

5. The valve spring as claimed in claim 1, wherein the predetermined area of contact defines an angle of approximately 200°, and wherein the diameter of each adjacent winding is constant over this angle.

6. The valve spring as claimed in claim 1, in which further windings are provided, which rest on the first mentioned windings already in a noncompressed condition.

7. The valve spring as claimed in claim 6, characterized in that the further windings are provided with a ground end surface.

8. The valve spring as claimed in claim 1, in which the plurality of first windings form a central body of the valve spring having a cylindrical shape, and in which each transitional zone has a diameter which is smaller than the diameter of the first windings of the central body.

9. The valve spring as claimed in claim 1, in which the plurality of first windings form a central body of the valve spring having a cylindrical shape, and in which each transitional zone has a diameter, which is greater than the diameter of the first windings of the central body.

* * * * *